(12) United States Patent
Svejkovsky

(10) Patent No.: US 11,390,474 B2
(45) Date of Patent: Jul. 19, 2022

(54) SYSTEM AND APPARATUSES FOR LOADING, TRANSPORTING AND UNLOADING FRAGILE PRODUCT

(71) Applicant: Paul Blake Svejkovsky, Mabank, TX (US)

(72) Inventor: Paul Blake Svejkovsky, Mabank, TX (US)

(73) Assignee: Paul Blake Svejkovsky, Mabank, TX (US)

( * ) Notice: Subject to any disclaimer, the term of this patent is extended or adjusted under 35 U.S.C. 154(b) by 0 days.

(21) Appl. No.: 16/995,322

(22) Filed: Aug. 17, 2020

(65) Prior Publication Data
US 2022/0048719 A1 Feb. 17, 2022

(51) Int. Cl.
| | | |
|---|---|---|
| *B65G 69/16* | (2006.01) | |
| *B65G 47/44* | (2006.01) | |
| *B65G 69/02* | (2006.01) | |
| *B65G 47/58* | (2006.01) | |
| *B65G 47/78* | (2006.01) | |
| *B65B 5/06* | (2006.01) | |
| *B65G 27/12* | (2006.01) | |
| *B65B 1/08* | (2006.01) | |

(52) U.S. Cl.
CPC ............... *B65G 69/16* (2013.01); *B65B 1/08* (2013.01); *B65B 5/064* (2013.01); *B65G 27/12* (2013.01); *B65G 47/44* (2013.01); *B65G 47/58* (2013.01); *B65G 47/78* (2013.01); *B65G 69/02* (2013.01); *B65G 2201/0258* (2013.01); *B65G 2203/0266* (2013.01); *B65G 2814/0205* (2013.01)

(58) Field of Classification Search
CPC ........ B65G 27/04; B65G 27/10; B65G 27/12; B65G 47/44; B65G 47/58; B65G 47/78; B65G 69/02; B65G 69/16; B65G 2201/0258; B65G 2203/0266; B65G 2814/0205; B65B 1/08; B65B 5/064
See application file for complete search history.

(56) References Cited

U.S. PATENT DOCUMENTS 3,800,837 A * 4/1974 Pleus ..................... B65B 1/08
141/131
4,351,141 A * 9/1982 Glorfield ................. B65B 1/30
141/131

(Continued)

*Primary Examiner* — Gene O Crawford
*Assistant Examiner* — Keith R Campbell
(74) *Attorney, Agent, or Firm* — Patrick K. Steele

(57) ABSTRACT

A system and a method for gently loading, transporting and unloading frangible products using totes is provided. The system includes a loading station at a first location, an unloading station at a second location and a plurality of totes for use in storing the frangible products for transportation from the first location to the second location. The totes include an interior space that is upwardly curved for gently receiving the frangible products therein as they are laterally discharged off of a lateral discharge portion of the reciprocating conveyor. Two or more totes can be sequentially loaded along the lateral discharge portion of the reciprocating conveyor using backpressure caused by accumulation of frangible product along the edge of the lateral discharge portion of the reciprocating conveyor to redirect incoming frangible products towards a downstream section of the lateral discharge portion of the reciprocating conveyor.

16 Claims, 9 Drawing Sheets

(56) References Cited

U.S. PATENT DOCUMENTS

| | | | | |
|---|---|---|---|---|
| 6,378,688 B1* | 4/2002 | Fitzgerald | ............. | B65G 27/04 |
| | | | | 198/360 |
| 8,162,148 B2* | 4/2012 | Miedema | ................ | B65B 37/04 |
| | | | | 209/309 |
| 2003/0127302 A1* | 7/2003 | Brewer | ................. | B65G 47/44 |
| | | | | 198/436 |
| 2015/0239677 A1* | 8/2015 | Svejkovsky | ........... | B65G 47/78 |
| | | | | 198/360 |

* cited by examiner

SYSTEM AND APPARATUSES FOR LOADING, TRANSPORTING AND UNLOADING FRAGILE PRODUCT

STATEMENT OF RELATED APPLICATIONS

This application depends from and claims priority to U.S. Provisional Patent Application Ser. No. 62/631,705 filed in the U.S. Patent and Trademark Office on 17 Feb. 2018, which is incorporated by reference as if fully set forth herein.

BACKGROUND

Field of the Invention

The present invention relates to a system for loading, transporting and/or unloading a product that is easily breakable. More specifically, the present invention relates to a system for loading, transporting and unloading a large plurality of fragile food portions such as potato chips in a manner and with apparatuses that prevent unwanted breakage of the food portions, that prevent unwanted bridging and clumping of food portions, and that promote product freshness.

Background of the Related Art

Many products are frangible, meaning that the products are easily broken or damaged as a result of being processed, bagged, packaged and/or transported to a location at which the products are to be processed, bagged or packaged. The problem is exacerbated when the products are produced in large pluralities and moved in a manner in which the products contact one another during loading, transport and unloading, in addition to when the frangible products contact each other during processing, bagging or packaging.

Transporting products for processing, bagging or packaging is especially necessary where, for example, a central processing, bagging or packaging facility can be used for processing, bagging or packaging a variety of products. Advantageously, this enables a single facility and the equipment at the single facility to be economically used to process, bag or package products produced from a plurality of production facilities instead of each production facility having its own dedicated processing, bagging or packaging equipment. The overall cost of the equipment, of maintaining the equipment and the cost of labor to operate and maintain the equipment to be shared by a plurality of processing facility operators rather than each processing facility operator having to carry these costs on their own.

A disadvantage of such a sharing arrangement under which a single facility for processing, bagging or packaging frangible products is that the frangible products must be loaded at the facility at which they are produced, then transported to the processing, bagging or packaging facility, and then unloaded at the processing, bagging or packaging facility. Breakage and damage can occur during the loading, transportation and unloading of the frangible products, resulting in losses that undercut the advantage of sharing the processing, bagging and packaging facility.

BRIEF SUMMARY

One embodiment of the present invention provides a system for loading, transporting and unloading a large plurality of frangible products, for example, frangible food portions, that prevents unwanted breakage of the frangible products and the losses that accompany breakage. One embodiment of the system for loading a large plurality of frangible products into totes for transportation of the frangible products that prevents unwanted breakage comprises a plurality of totes for use in being loaded with fragile products and for transporting the fragile products from a first location to a second location with minimal breakage, each tote includes a base, an open top, a removable lid sized to engage the open top of the tote to close the open top of the tote, a first side, a second side opposite the first side, a first end connected to the base, the first side and to the second side, a second end opposite the first end and connected to the base, the first side and to the second side, the first end having a gate with an upwardly curved shape on a lower portion of the gate, and a removable gate closure also having a correspondingly upwardly curved shape on a lower portion of the gate closure to removably engage the upwardly curved portion on the lower portion of the gate to close the gate, the gate closure being movable from a closed position, to close the gate and thereby retain the frangible products within the tote, to an open position to open the gate to allow the frangible products to be moved out of the tote through the open gate, and an interior space also having a surface with an upwardly curved shape, the upwardly curved-shaped surface of the interior space of the tote having a first steeply sloped portion proximal to an intersection between the first side and the open top of the tote, a lowermost portion proximal to the base of the tote, and a first transitionally sloped portion intermediate the lowermost portion of the surface of the interior space and the first steeply sloped portion of the surface of the interior space. The embodiment of the system further includes a loading station at a first location such as, for example, a production facility, the loading station including a reciprocating conveyor having a receiving portion at a first end at which the plurality of frangible products are received onto the reciprocating conveyor, a second end, a smooth surface intermediate the receiving portion at the first end and the second end for supporting and conveying a large plurality of the frangible products from the first end to the second end, and a lateral discharge portion at the second end at which the plurality of frangible products are removed from the reciprocating conveyor, the reciprocating conveyor operable by cyclically moving from a first position in a first direction and at a first rate of acceleration to move the products supported on the smooth surface a distance to a second position, and then by returning from the second position back to the first position by moving in a second direction that is opposite the first direction, at a second rate of acceleration that exceeds the magnitude of the first rate of acceleration to cause the products supported on the smooth surface to slide on the smooth surface. This type of conveyor is often referred to as a differential impulse conveyor or a reciprocating conveyor. The embodiment of the system further includes a tote platform at the loading station that is disposed laterally adjacent to the lateral discharge portion of the reciprocating conveyor, the tote platform having a top portion for engaging the base of a plurality of the totes, a first end of the top portion of the tote support for supporting the plurality of totes with the open tops of the plurality of totes disposed adjacent to the lateral discharge portion at the second end of the reciprocating conveyor such that frangible products discharged from the discharge portion of the reciprocating conveyor during operation of the reciprocating conveyor fall of the lateral discharge portion and downwardly to impinge on the first steeply sloped portion of the surface of the interior space of the tote proximal to the intersection between the first side and the open top of the tote to load the plurality of totes at the first end of the tote platform, the tote platform further having a second end to which the plurality of loaded totes can be moved after being filled with frangible product at the first end of the tote platform. It will be understood that during the initial loading of a totes at the loading station, the frangible products impinge on the first steeply sloped portion of the surface of the interior space of a tote and slide downwardly and then along the first transitionally sloped portion of the surface of the interior space of the tote and then onto the lowermost portion of the surface of the interior space of the tote.

In one embodiment of the system, each of the plurality of totes further includes a second transitionally sloped portion of the surface of the interior space of the tote that is opposite from the first transitionally sloped portion of the surface of the interior space of the tote, and the second transitionally sloped portion of the tote smoothly transitions with the lowermost portion of the surface of the interior space of the tote as does the first transitionally sloped portion of the surface of the interior space of the tote. Each of the plurality of totes further includes a second steeply sloped portion of the surface of the interior space of the tote that is opposite the first steeply sloped portion of the surface of the interior space of the tote. Together, the first steeply sloped portion, the second transitionally sloped portion adjacent to the first steeply sloped portion, the lowermost portion adjacent to the first transitionally sloped portion, the second transitionally sloped portion adjacent to the lowermost portion, and the second steeply sloped portion adjacent to the second transitionally sloped portion of the surface of the interior space of the tote, along with the first end with the gate closure in the closed position and the second end of the tote, and the removable lid, collectively make up the surfaces that surround and define the upwardly curved interior space of each of the plurality of the totes. Each of the first steeply sloped portion, the first transitionally sloped portion adjacent to and below the first steeply sloped portion, the lowermost portion adjacent to and below the first transitionally sloped portion, the second transitionally sloped portion adjacent to and above the lowermost portion, the second steeply sloped portion adjacent to and above the second transitionally sloped portion of the surface of the interior space, blend each with one or two of the adjacent surfaces to define a smooth and continuous surface of the interior space that is free of edges or obstacles that would abruptly engage or impact a frangible product as it is being loaded along with a plurality of frangible products through the open top (with lid removed from the tote) and into the interior space of the tote. It will be understood that impact with edges or obstacles would cause unwanted breakage of the frangible products. Initial loading of frangible products that impinge on the first steeply sloped portion of the tote causes the frangible products to slide without breakage downwardly along the first steeply sloped portion and then along the first transitionally sloped portion adjacent thereto and therebelow, and then along the lowermost portion of the interior space in a direction from the first side of the tote towards the second side of the tote, and then to begin sliding upwardly along the second transitionally shaped portion as the frangible products decelerate and slow down. Additional frangible products then cause the lowermost portion of the interior space begin to fill and the addition of still more frangible products may cause the frangible products that accumulate on the lowermost portion to shift as the weight of loading frangible products accumulates on one side, i.e. on the first side of the interior space adjacent to the first steeply sloped portion of the surface surrounding the interior space of the tote. The upwardly curved interior space can be loaded in this manner by frangible products spilling from the lateral discharge portion of the reciprocating conveyor with minimal breakage. A plurality of totes can be loaded by strategic placement of the totes on the first end of the tote platform. That is, loading of the plurality of totes occurs with the lid removed from the open top of each of the plurality of totes and the gate closures in the closed position to close the gates at the first ends of the plurality of totes, and with the bases of the totes supported on the first end of the top portion of the tote platform with the first side of the plurality of totes disposed proximal to and slightly below the edge of the lateral discharge portion at the second end of the reciprocating conveyor. In this arrangement, the reciprocating conveyor will convey a plurality of the frangible products to the lateral discharge portion of the reciprocating conveyor wherein the frangible products are discharged laterally from the lateral discharge portion of the reciprocating conveyor over the intersections between the first sides and the open tops of the plurality of totes on the first end of the tote platform and into the open tops of the plurality of totes to impinge on the first steeply sloped portions of the plurality of totes on the first end of the tote platform. The frangible products will impinge on the first steeply sloped portion of the interior space of each of the plurality of totes and the frangible products will slide down the first steeply sloped portion, then along the first transitionally sloped portion and then towards the lowermost portion of the interior space of each of the plurality of totes. Additional frangible products are discharged from the lateral discharge portion at the second end of the reciprocating conveyor into the open tops of the plurality of totes until the interior space of each of the plurality of totes is filled. The plurality of frangible products discharged into the plurality of totes can then be sealed by addition of the lid to close the open top and the frangible products may be kept fresh while being transported within the plurality of totes from the first location to a second location for, for example, processing, bagging and/or packaging.

In one embodiment of the system of the present invention, the system further comprises a switch that is operable for activating the reciprocating conveyor from a deactivated mode to an activated mode and for disengaging the reciprocating conveyor from the activated mode to the deactivated mode. The reciprocating conveyor can be disengaged using the switch to allow the loaded plurality of totes having interior spaces full of the frangible products to be vibrationally settled (as described in more detail below) within the totes, moved to a second end of the tote platform, removed for transportation and replaced with a plurality of empty totes for further loading of frangible products.

One embodiment of the system of the present invention further includes a vibration member coupled to the tote platform, the vibration member having an activated mode for imparting vibrations to the top portion of the tote platform to vibrationally settle the frangible products loaded into the interior space of the plurality of totes into a more densely packed configuration. After vibrational settling, the vibration member can be deactivated. Optionally, additional frangible products may be added to the totes after vibrational settling.

In one embodiment of the system of the present invention, the lateral discharge portion at the second end of the reciprocating conveyor is sized to discharge frangible products along a section of the reciprocating conveyor that is longer than the first side of one of the plurality of totes, and the first end of the tote platform is sized to accommodate at least two totes one beside the other and arranged in a configuration in which the first sides of each of the at least two totes are proximal to the discharge portion of the reciprocating conveyor so that frangible products discharged from the discharge portion of the reciprocating conveyor impinge upon the first steeply sloped portion of the surface of the interior space of each of the at least two totes. In another embodiment of the system of the present invention, the lateral discharge portion at the second end of the reciprocating conveyor is sized to laterally discharge frangible products along a section of the reciprocating conveyor that is at least twice as long as the first side of one of the plurality of totes, and the first end of the tote platform is sized to accommodate two or more totes arranged in a configuration in which the first sides of the two or more totes are proximal to the discharge portion of the reciprocating conveyor so that frangible products discharged from the discharge portion of the reciprocating conveyor impinge upon the first steeply sloped portion of the surface of the interior space of each of the two or more totes. This arrangement conveniently allows for efficient loading of two or more of the plurality of totes. In this arrangement, a first of the two or more totes is proximal to the first end of the reciprocating conveyor, a second of the two or more totes is distal to the first end of the reciprocating conveyor and the first side of the first of the two or more totes is aligned with and proximal to the first side of the second of the two or more totes on the first end of the top portion of the tote platform.

The arrangement discussed above enables two or more totes to be loaded with the frangible products delivered to the totes by the reciprocating conveyor in a sequential manner using accumulated product backpressure. More specifically, the lateral discharge portion of the reciprocating conveyor may include a downwardly sloped or pitched surface adjacent to the lateral edge that has no wall to retain the frangible products on the reciprocating conveyor. The side of the reciprocating conveyor opposite to the lateral discharge area includes a wall that prevents frangible products from leaving the reciprocating conveyor laterally in that direction, and the second end of the reciprocating conveyor may include an end wall that prevents frangible products from leaving the reciprocating conveyor by continued forward movement on the reciprocating conveyor. The lateral discharge portion of the reciprocating conveyor, therefore, is the only portion of the reciprocating conveyor that allows frangible products moved on the reciprocating conveyor to leave the conveying surface. In this arrangement, the first of the two or more totes that is proximal to the first end of the reciprocating conveyor will fill up first due to frangible product arriving at the lateral discharge portion of the reciprocating conveyor finding the path of least resistance off the conveying surface. Upon filling of the first of the two or more totes that is proximal to the first end of the reciprocating conveyor, accumulation of frangible products on the lateral discharge portion of the reciprocating conveyor begins to occur because frangible products have no room to leave the lateral discharge portion due to blockage by the loaded first tote. This results in backpressure against incoming additional frangible products that causes frangible products to move further downstream and to find a new path of least resistance off the lateral discharge portion and into the second of the two or more totes that is distal to the first end of the reciprocating conveyor. Upon filling of the second and perhaps additional totes of the two or more totes arranged on the top portion of the tote platform, the reciprocating conveyor can be temporarily deactivated, the frangible products in the two or more filled totes can be vibrationally settled by activation of a vibration member on the tote platform, and the two or more loaded totes can be moved to the second end of the tote platform for removal and transportation.

In one embodiment of the system of the present invention, the top surface of the tote platform of the loading station comprises a plurality of elongate and rotatable cylindrical rollers, each roller rotatably secured to a frame of the tote platform so that the axis of each roller is parallel to and in an aligned configuration with the axes of the others of the plurality of rollers to enable the plurality of loaded totes to be easily moved and conveyed from the first end of the tote platform and along and atop the plurality of rollers to a second end of the tote platform with minimal frictional resistance to movement of the loaded totes.

One embodiment of the system of the present invention further includes an unloading station at a second location that is spaced apart from the first location, the unloading station including a plurality of tributary troughs, each tributary trough having a first end for receiving a plurality of frangible products from a loaded tote that is being unloaded onto the tributary trough and a second end for discharging the plurality of fragile products to a receiving conveyor, wherein the second end of the tributary trough is at a lower elevation than the first end of the tributary trough to impart a decline to each of the plurality of tributary troughs. The system of the present invention further includes a plurality of tote supports at the unloading station, each tote support being disposed proximal to and at a lower elevation than the first end of one of the plurality of tributary troughs, each tote support having a first end, a second end and a stop member thereon to engage at least a portion of the base of a tote disposed on and supported on the tote support, the second end of each of the tote supports being at a lower elevation than the first end of the tote support to impart a decline to each of the tote supports, the decline being in the same direction as the decline of the one of the plurality of tributary troughs proximal to the tote support. Each of the plurality of tote supports and the one of tributary troughs disposed adjacent to each of the tote supports is configured so that a loaded tote disposed on the tote support is strategically positioned for discharging, upon removal of the gate closure from the first end of the tote, frangible products from the interior space of the tote, through the gate, and onto the first end of the tributary trough without unwanted breakage of the frangible products. That is, the lowermost point of the interior space, the lowermost point of the gate and the lowermost point of the conveying surface of the tributary trough are aligned one with the others so that the frangible products emerging from the interior space of the tote do not drop or fall an appreciable distance off of an upstream surface (i.e. from the interior space, or from the gate) onto a downstream surface (i.e. onto the gate, or onto the tributary trough). Preferably, the path from the lowermost point of the interior space of the tote, the lowermost point of the gate, and the lowermost point of the conveying surface of the tributary trough are all aligned and they further include the same profile. That is, the upwardly curved and concave cross-section profile of the interior space of the tote is matched by the profile of the gate, and the cross-sectional profile of the tributary trough matches that of the interior space of the tote and the gate. It will be understood that this arrangement minimizes breakage of frangible products by minimizing or eliminated edges or obstacles that could impact and break frangible products.

One embodiment of the unloading station of the system of the present invention includes a plurality of tote support vibration members, each tote support vibration member being coupled to one of the plurality of tote supports, each tote support vibration member being activatable to impart vibrations to the tote support to which it is coupled and to thereby impart vibrations to one of the plurality of totes supported thereon after the gate closure is removed to open the gate. The activation of the tote support vibration member, along the declined position of the tote on the tote support, causes the frangible products within the tote to gently move towards the gate, through the gate and onto the tributary trough. Optionally, a tributary trough vibration member can be used to promote movement of the frangible products from the first end of the tributary trough towards the second end of the tributary trough for being discharged to the receiving conveyor. Optionally, the tote support may be coupled to the first end of the tributary trough to enable the tote support vibration member to impart vibrations to both of the tote support and the tributary trough.

In one embodiment of the unloading station of the system of the present invention, a receiving conveyor is disposed proximal to the second ends of the plurality of tributary troughs to receive and convey frangible products discharged from the plurality of tributary troughs to one of a weighing machine, a packaging machine, a bagging machine and a processing facility at the second location. The receiving conveyor may be a reciprocating conveyor, a belt conveyor, or some other type of conventional conveyor. The unloading station is adapted for being used to gently unload a plurality of totes containing many various types of frangible products with minimal breakage.

Another embodiment of the system of the present invention for gently handling a stream of a plurality of fragile products, comprises a loading station having a reciprocating conveyor with a first end, a second end, a first side, a second side, an entry trough at the first end, and a lateral discharge ramp to receive a stream of fragile product from the entry trough, the lateral discharge ramp disposed along the first side of the reciprocating conveyor. The embodiment of the system of the present invention for gently handling a stream of a plurality of frangible products further includes a plurality of totes, each tote having a base, a top opening, a first end, a second end, a discharge opening at the first end, a gate closure removably securable to the tote at the discharge opening to close the discharge opening, and an interior storage space within the tote for receiving product laterally discharged from the lateral discharge ramp of the reciprocating conveyor and into the top opening, the interior storage space formed intermediate a first interior side wall and a second interior side wall and intermediate the top opening and an upwardly curved floor proximal to the bottom of the tote, the first interior side wall and the second interior side wall each including a steeply inclined upper portion and a transitionally curved lower portion where each of the first interior side wall and the second interior side wall meet the upwardly curved bottom portion of the surface of the interior space of the tote. Each tote further includes a lid for closing the top opening. The one or more totes are disposed in an empty condition with the lid removed from the top opening adjacent to and slightly below an edge of the discharge ramp of the reciprocating conveyor with one of the first interior side wall and the second interior side wall proximal to the lateral discharge ramp, the fragile product received into the top opening of the tote impinges upon and then slides gently along the upper portion of the one of the first interior side wall and the second interior side wall disposed adjacent to an edge of the lateral discharge ramp and then along the curved lower portion of the one of the first interior side wall and the second interior side wall disposed adjacent the edge of the lateral discharge ramp before sliding gently along the upwardly curved bottom of the tote to enable the plurality of fragile articles to be loaded into the tote and to gently slide along the edge of the lateral discharge ramp of the reciprocating conveyor, off the edge of the lateral discharge ramp, along the upper portion of the one of the first interior side wall and the second interior side wall disposed adjacent to the edge of the lateral discharge ramp, along the lower curved portion of the one of the first interior side wall and the second interior side wall disposed proximal to and adjacent to the edge of the lateral discharge ramp, and onto the upwardly curved bottom where the frangible products come to rest. Upon initial loading of a tote, the plurality of fragile products may further slide along the upwardly curved bottom of the tote to a lowermost portion of the curved bottom, whereupon the plurality of fragile products decelerate as they move beyond the lowermost portion of the upwardly curved bottom towards the lower curved portion of the other of the first interior side wall and the second interior wall. After initial loading of at least some of the frangible products into a tote, the incoming frangible products may accumulate atop previously arriving frangible products until an imbalance causes a shift in the frangible products within the upwardly curved surface of the interior space of the tote to cause the frangible products distal to the edge of the lateral discharge ramp to rise as the frangible products proximal and adjacent to the edge of the discharge ramp are lowered to restore a more even distribution depth of the gently loaded frangible products. Stated another way, due to the smooth curvature of the upwardly curved surface of the interior space of the tote, as additional fragile product enters the tote through the top opening and accumulates along one of the first interior side wall and the second interior side wall that is proximal to and adjacent to the edge of the lateral discharge ramp of the reciprocating conveyor, the fragile product accumulated in the upwardly curved bottom of the surface of the interior space is pushed upwardly along the curved lower portion of the other of the first interior side wall and the second interior side wall that is distal to the edge of the lateral discharge ramp and opposite the upwardly curved bottom of the surface of the interior space from the one of the first interior side wall and the second interior side wall adjacent to the edge of the discharge ramp as the accumulated product supported on the upwardly curved bottom of the surface of the interior space is displaced along the curved bottom or the surface of the interior space. The shape of the first interior side wall, the second interior side wall and the upwardly curved bottom of the surface of the interior space of the tote prevents the fragile product being loaded into the tote from being broken due to abrupt impact with an edge or a surface that is orthogonal to the path of movement of the frangible product.

One embodiment of the system of the present invention provides for the gentle handling system comprising a reciprocating conveyor with a first end, a second end, a first side, a second side, an entry trough at the first end, and a lateral discharge ramp to receive a stream of fragile product from the entry trough, the lateral discharge ramp disposed along the first side of the reciprocating conveyor. The system further comprises one or more product totes, each product tote having a bottom, a top opening, a first end, a second end, a discharge opening at the first end, a gate removably received onto the tote at the second end to close the discharge opening, and an interior storage space within the tote for receiving frangible product discharged from the lateral discharge ramp of the reciprocating conveyor and into the top opening, the interior storage space formed intermediate a first side wall and a second side wall and intermediate the top opening and a curved floor proximal to the bottom of the tote. The first side wall and the second side wall each include a steep top portion and a inwardly curved lower portion where each of the first side wall and the second side wall meet the upwardly curved bottom so that with the tote disposed below the lateral discharge ramp with one of the first side wall and the second side wall proximal to the discharge ramp, the fragile product received into the top opening of the tote slides gently down the top portion of the one of the first side wall and the second side wall disposed adjacent the lateral discharge ramp and along the upwardly curved lower portion of the one of the first side wall and the second side wall disposed adjacent the lateral discharge ramp before sliding gently along the curved bottom of the tote. The system enables fragile product to be loaded into the tote and to gently slide along the top portion of the one of the first side wall and the second side wall disposed adjacent to the lateral discharge ramp, and to then slide along the lower curved portion of the one of the first side wall and the second side wall disposed adjacent to the lateral discharge ramp to the curved bottom, and the fragile product then slides along the curved bottom while decelerating. As additional fragile product enters the tote through the top opening, the fragile product accumulated in the upwardly curved bottom is pushed upwardly along the curved lower portion of the other of the first side wall and the second side wall that is distal to the lateral discharge ramp and opposite the upwardly curved bottom from the one of the first side wall and the second side wall adjacent to the lateral discharge ramp as the accumulated product in the upwardly curved bottom is displaced along the upwardly curved bottom. The shape of the first side wall, the second side wall and the upwardly curved bottom of the tote prevents the fragile product being loaded into the tote from being broken due to abrupt impact.

Another aspect of the present invention provides a method of loading frangible product into totes. One embodiment of the method of filling two or more totes with frangible products for transportation of the frangible products comprises the steps of providing a plurality of totes, each tote having a base, an open top, a removable lid sized to engage the open top of the tote to close the open top, a first side, a second side, opposite the first side, a first end intermediate the first side and the second side, a second end opposite the first end and intermediate the first side and the second side, the first end having a gate with an upwardly concave shape, and a gate closure movable between a closed position to close the gate and an open position to open the gate, and an interior space defined by an upwardly concave surface, the upwardly concave surface having a first steeply sloped portion proximal to an intersection between the first side and the open top of the tote, a lowermost portion proximal to the base of the tote, and a first transitionally sloped portion intermediate the lowermost portion of the interior space and the first steeply sloped portion, then providing, at a first location, a reciprocating conveyor having a receiving portion at a first end at which the plurality of products are received onto the reciprocating conveyor, a second end, a smooth surface for supporting and conveying a large plurality of the frangible products from the first end towards the second end, and a lateral discharge portion proximal to the second end at which the plurality of frangible products are laterally removed from the reciprocating conveyor, the reciprocating conveyor operable by cyclically moving from a first position in a first direction and at a first rate of acceleration to move the products supported on the smooth surface a distance to a second position, and then returning from the second position to the first position by moving in a second direction, opposite the first direction, at a second rate of acceleration that exceeds the magnitude of the first rate of acceleration to cause the products supported on the smooth surface to slide on the smooth surface, and then further providing, at the first location, a tote platform having a top portion for engaging the base of the plurality of totes, a first end of the top portion for supporting the plurality of totes adjacent to the discharge portion at the second end of the reciprocating conveyor such that frangible products discharged from the discharge portion of the reciprocating conveyor fall downwardly and impinge on the first steeply sloped portion proximal to then intersection between the first side and the open top of the tote, the tote platform further having a second end to which a tote can be moved after being filled with frangible product at the first end of the tote platform. The embodiment of the method further includes the steps of positioning at least two of the plurality of totes, with the lid removed and the gate closure in the closed position to close the gate at the first end of the at least one tote, with the bases of the totes supported on the first end of the top portion of the tote platform with the first side of the at least two totes disposed proximal to and below the lateral discharge portion at the second end of the reciprocating conveyor, activating the reciprocating conveyor to convey a plurality of the frangible products to the lateral discharge portion of the reciprocating conveyor, discharging at least some of the plurality of the frangible products from the lateral discharge portion of the reciprocating conveyor over the intersection between the first side and the open top of the tote and into the open top of the tote on the tote platform and proximal to the first end of the reciprocating conveyor to impinge on the first steeply sloped portion, filling the tote on the tote platform that is proximal to the first end of the reciprocating conveyor until backpressure is created by an accumulation of frangible products along the edge of the lateral discharge portion adjacent to the tote on the tote platform that is proximal to the first end of the reciprocating conveyor, conveying incoming frangible products further down the reciprocating conveyor towards the second end of the reciprocating conveyor and towards the edge of the lateral discharge portion of the reciprocating conveyor that is adjacent to a tote that is distal to the first end of the reciprocating conveyor and adjacent to the tote that is proximal to the first end of the reciprocating conveyor, filling the tote on the tote platform that is distal to the first end of the reciprocating conveyor and adjacent to the tote that is proximal to the first end of the reciprocating conveyor with frangible products discharged from the edge of the lateral discharge portion of the reciprocating conveyor, deactivating the reciprocating conveyor, vibrationally settling the frangible products in the tote that is proximal to the first end of the reciprocating conveyor and in the tote that is distal to the first end of the reciprocating conveyor and transporting the frangible products in the tote that is proximal to the first end of the reciprocating conveyor and in the tote that is distal to the first end of the reciprocating conveyor to a second location, wherein filling the totes includes causing the frangible products slide down the first steeply sloped portion, along the first transitionally sloped portion and towards the lowermost portion of the interior space of the at least one tote. The plurality of frangible products discharged into the tote that is proximal to the first end of the reciprocating conveyor and in the tote that is distal to the first end of the reciprocating conveyor can be transported within the totes from the first location to a second location for one of processing, bagging and packaging.

An embodiment of the system of the present invention is described in detail using the following description which refers to drawings appended hereto. It will be understood that this is merely a single embodiment and is not limiting of the present invention.

DETAILED DESCRIPTION

Some embodiments of the system of the present invention include a loading station at a first location at which a plurality of totes are gently loaded with a plurality of frangible products such as, for example, potato chips, one or more trucks for transporting the totes filled with the frangible products to a second location, and an unloading station at the second location at which the plurality of totes are gently unloaded and the frangible products transported in the plurality of totes are routed to a receiving conveyor that conveys the stream of frangible products to one of a weighing machine, a bagging machine, a packaging machine and a processing machine.

Figure 1A:
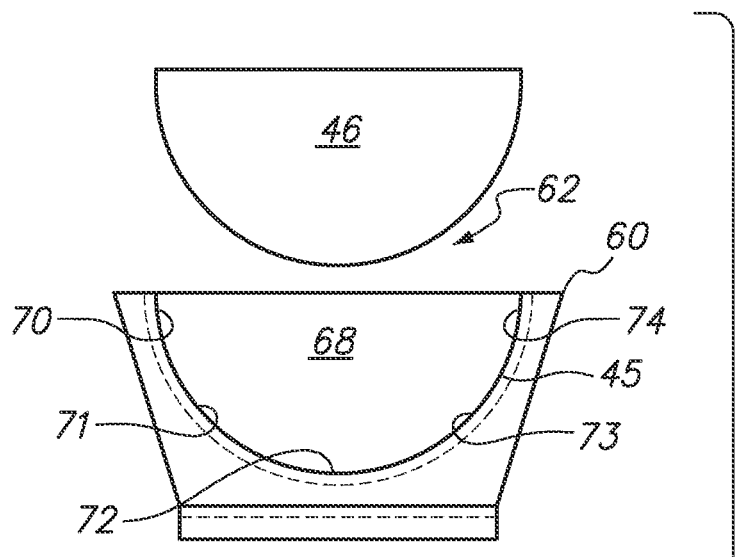
FIG. 1A is an elevation end view of an embodiment of a tote for use in being gently loaded with fragile products, for transporting fragile products, and for gently unloading fragile products with minimal breakage in accordance with an embodiment of the system of the present invention.

FIG. 1A is an elevation end view of an embodiment of a tote 60 for use in being gently loaded with fragile products 50 (not shown in FIGS. 1A and 1B), for transporting fragile products 50, and for gently unloading fragile products with minimal breakage in accordance with an embodiment of the system of the present invention. Embodiments of the system of the present invention include a plurality of totes 60. As shown in FIG. 1A, each tote 60 includes a base 60A, a top 64, an opening 62 in the top 64 opposite to the base 60A, a first end 66, a gate 45 in the first end 66, a second end 67 (not shown in FIG. 1A), a gate closure 46 removably receivable to close the gate 45. Optionally, the base 60A includes one or more channels 60B for receiving forks of a fork lift machine (not shown in FIG. 1A) for lifting and moving the tote 60. The tote 60 further includes an upwardly curved and concave interior space 68 for gently receiving and storing frangible products 50 (not shown in FIG. 1A) for transportation. The interior space 68 is defined by a first steeply sloped wall portion 70, a first transitionally sloped wall portion 71 adjacent to the first steeply sloped wall portion 70, a lowermost portion 72 proximal to the base 60A and adjacent to the first transitionally sloped wall portion 71, a second transitionally sloped wall portion 73 adjacent to the lowermost portion 72 and opposite the first transitionally sloped wall portion 71, and a second steeply sloped wall portion 74 adjacent to the second steeply sloped wall portion 73 and opposite the first steeply sloped wall portion 70. These five wall portions, the first steeply sloped wall portion 70, the first transitionally sloped wall portion 71, the lowermost portion 72, the second transitionally sloped wall portion 73, and the second steeply sloped wall portion 74, together define the surfaces that surround and define the interior space 68 of the tote 60 and together form an upwardly curved cross-sectional profile as shown in FIG. 1A. The frangible product (not shown) can be introduced into the interior space 68 in a specific manner that reduces or minimizes breakage, as will be discussed below in connection with the loading station 100.

The tote 60 may further include a peripheral slot 60C along the gate 45 at the first end 66 of the tote 60 for receiving the edge 46A of the correspondingly shaped gate closure 46. The peripheral slot 60C is open at the top 64 for receiving the gate closure 46. The tote 60 may comprise a number of various materials that are of sufficient strength and rigidity and that are adapted for easy cleaning, but is preferably formed of plastic.

Figure 1B:
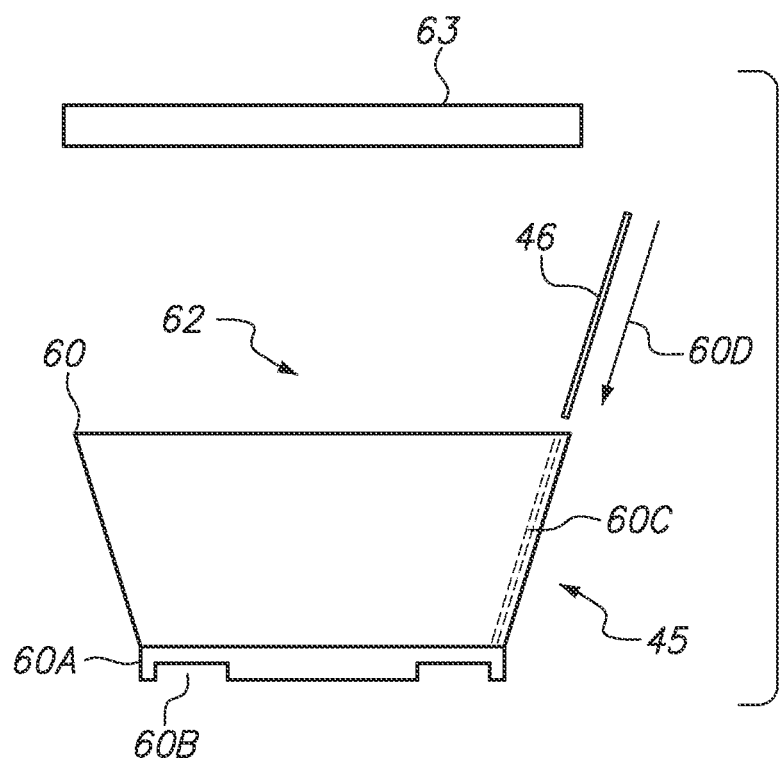
FIG. 1B is an elevation side view of the tote of FIG. 1A.

FIG. 1B is an elevation side view of the tote 60 of FIG. 1A. FIG. 1B shows the second end 67 of the tote 60 and the base 60A which includes channels 60B corresponding to the size and positions of forks of a fork lift truck (not shown) that may be used for moving the totes 60. The dotted lines in FIG. 1B reveal a perimeter channel 60C surrounding the gate 45 into which the gate closure 46 may be slid to close or open the gate 45. For example, but not by way of limitation, the gate closure 46 may be aligned with the perimeter channel 60C as shown in FIG. 1B, then inserted into the perimeter channel 60C by moving the aligned gate closure 60C in the direction of the arrow 60D until the gate 45 is closed. The tote 60 can then be used at a loading station at the first location to gently receive and store frangible products 50. Once gently filled with frangible products, the tote 60 can be closed by securing a lid 63 to close the open top 64 for transportation to a second location having an unloading station.

Figure 2:
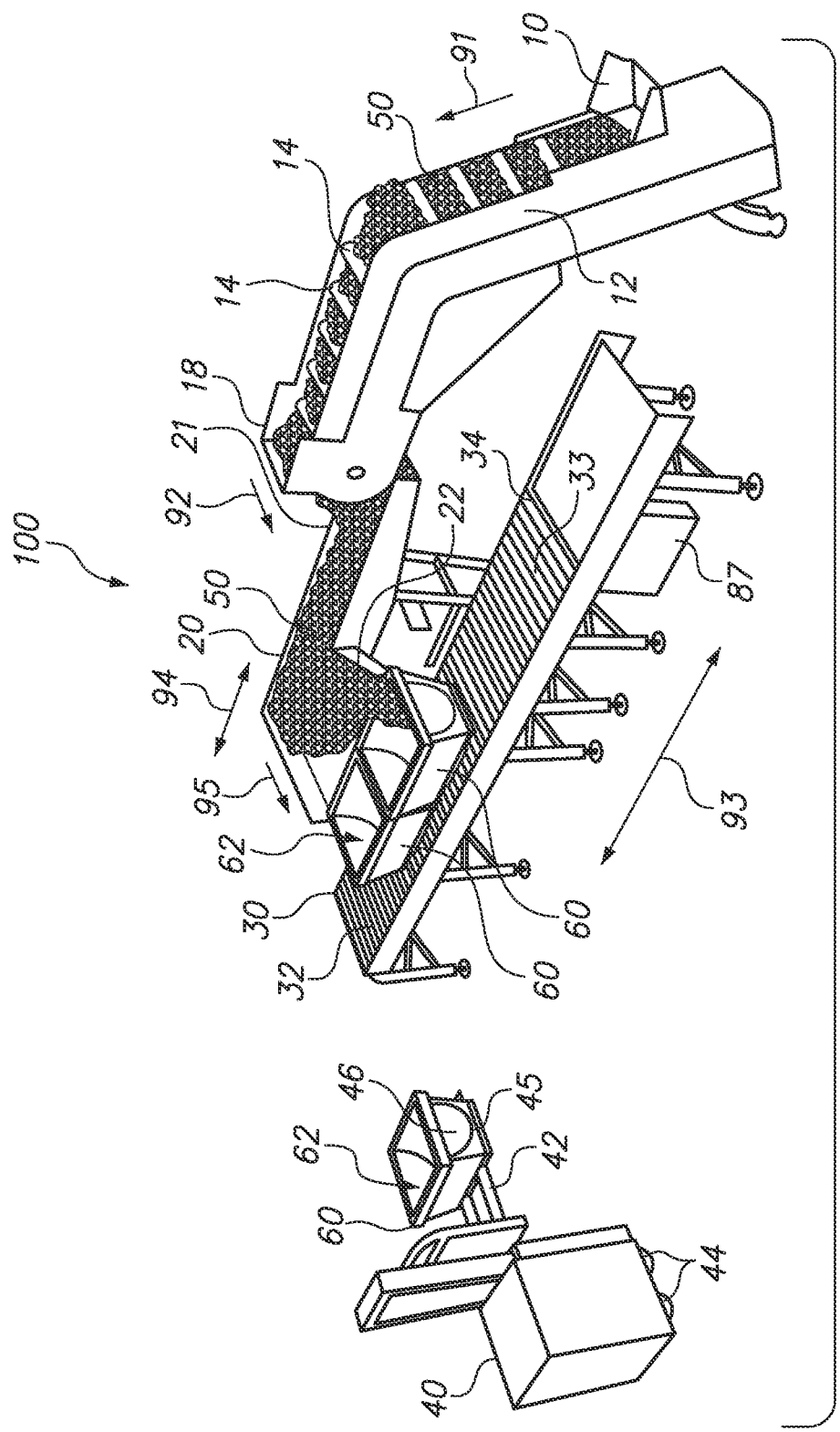
FIG. 2 is a perspective view of an embodiment of a loading station used at a first location to gently load a plurality of the totes of FIGS. 1A and 1B with minimal breakage.

FIG. 2 is a perspective view of an embodiment of a loading station 100 used at a first location to load a plurality of the totes 60 of FIGS. 1A and 1B with minimal breakage. The loading station 100 includes a reciprocating conveyor 20 having a receiving portion 21 to receive a stream of a plurality of frangible products 50 from a supply conveyor 10, a lateral discharge portion 22 for discharging a stream of a plurality of frangible products 50 from the reciprocating conveyor 20, a tote platform 30 having a first end 32, a second end 34, a plurality of parallel and rotatable rollers 33, and a vibration member 87. The vibration member 87 is activatable to impart vibrations to the tote platform 30 for vibrationally settling frangible products 50 loaded into a tote 60 into a more densely packed configuration. The supply conveyor 10 shown in FIG. 2 is an escalator-type supply conveyor 10 having a plurality of spaced-apart baffles 14 for engaging and supporting frangible product 50 as it is lifted in the direction of arrow 91 towards the discharge end 18 of the supply conveyor 10 and onto the receiving portion 21 of the reciprocating conveyor 20. The reciprocating conveyor 20 reciprocates in the direction of the double-headed arrow 94 at a first rate of acceleration to move the frangible product 50 then residing on the reciprocating conveyor 20 in the forward direction towards the left end of the double-headed arrow 94 and then at a second rate of acceleration that is greater than the first rate of acceleration in the reverse and opposite direction towards the right end of the double-headed arrow 94 to cause the frangible products 50 residing thereon to slip on the reciprocating conveyor 20. This cyclic action moves the frangible products 50 along the reciprocating conveyor 20 and then in the direction of the arrow 95 towards the lateral discharge portion 22 due to the side wall barrier 17 preventing the frangible products 50 from exiting the reciprocating conveyor 20 at any other position other than the lateral discharge portion 22.

FIG. 2 further shows a fork lift machine 40 having a plurality of wheels 44 and a pair of co-extending forks 42 for being received into the channels 60B (see FIG. 1B) on the base 60A of the totes 60 for stably supporting the totes 60 during movement within the first location. More specifically, as is shown in FIG. 2, the fork lift machine 40 is used to transport empty totes 60 to the tote platform 30 for loading by the reciprocating conveyor 20 and the fork lift machine 40 is used to transport loaded totes 60 from the tote platform 30 for transportation from the first location housing the loading station 100 to a second location housing an unloading station 200. It can be seen in FIG. 2 that the tote 60 being transported on the fork lift machine 40 and the pair of totes 60 supported on the first end 32 of the tote platform 30 all have the gate closure 46 in the closed position to close the gate 45 of the tote 60 and the lid 63 removed so that the totes 60 can be loaded at the loading station 100.

FIG. 2 shows a pair of totes 60 supported on the first end 32 of the tote platform 30 in position with the first side 66 disposed proximal to and slightly beneath the lateral discharge portion 22 of the reciprocating conveyor 20. FIG. 2 also shows how the initial loading occurs in the tote 60 to the right that is proximal to the first end 21 of the reciprocating conveyor 20 due to the path of least resistance at that time allowing frangible goods 50 to exit the reciprocating conveyor 20 via the lateral discharge portion 22 adjacent to the rightmost tote 60. It will be noted that the leftmost tote 60 in FIG. 2 that is distal to the first end 21 of the tote 60 remains empty as the rightmost tote 60 is filled.

Figure 3:
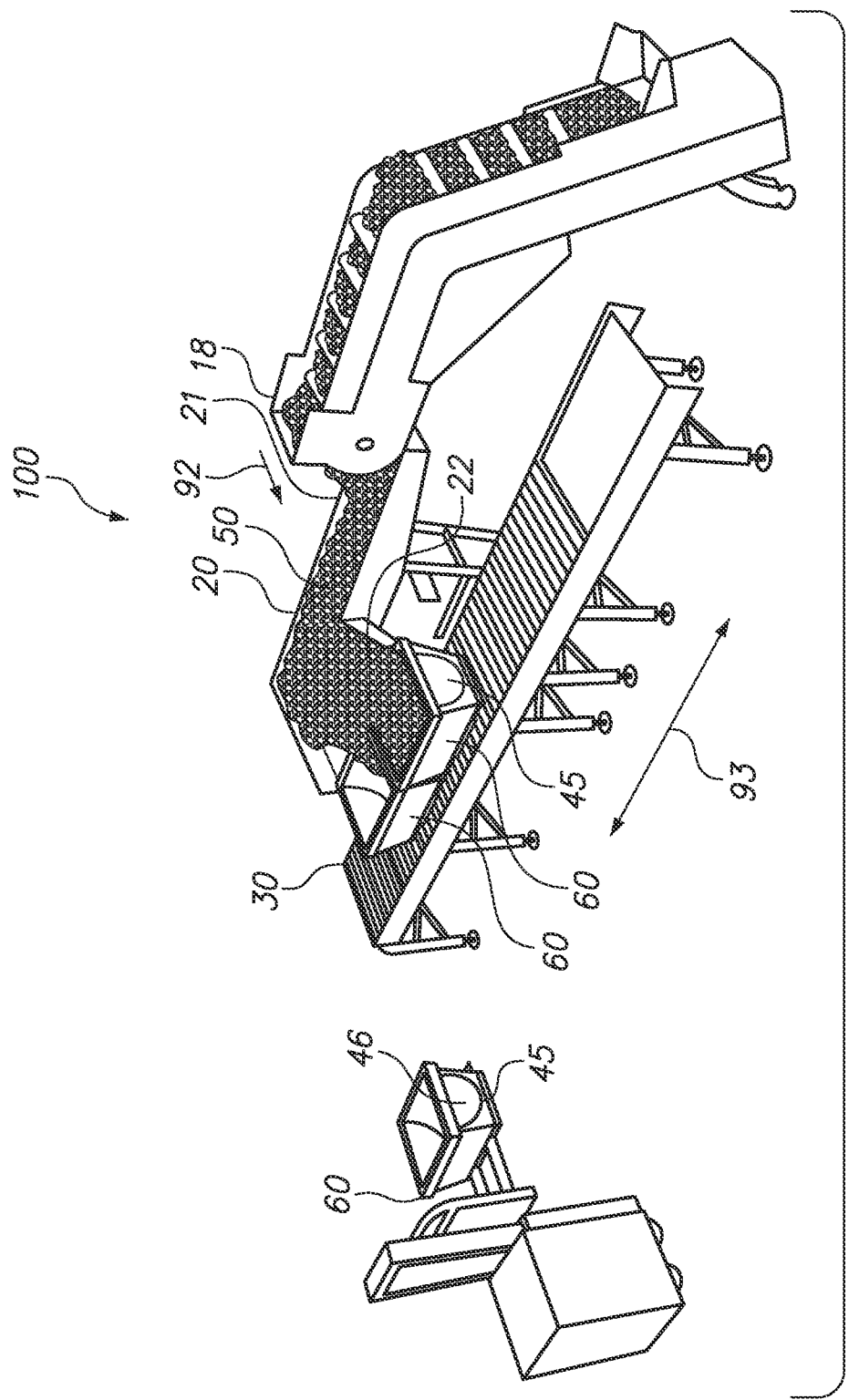
FIG. 3 is the loading station of FIG. 2 illustrating how back pressure resulting from the filling of a first tote causes fragile product to progress further along the reciprocating conveyor to be discharged at a position to fill the second tote adjacent to the first tote.

FIG. 3 is the loading station 100 of FIG. 2 illustrating how back pressure resulting from the filling of a rightmost tote 60 causes fragile products 50 to progress further along the reciprocating conveyor 20 to be discharged at a position on the lateral discharge portion 22 of the reciprocating conveyor 20 to begin filling the leftmost tote 60 adjacent to the rightmost tote 60 on the tote platform 30. The filling of the rightmost tote 60 results in backpressure or crowding that impedes the continued flow of frangible products 50 from entering the opening 62 of the rightmost tote 60 and this causes movement of incoming frangible products 50 on the reciprocating conveyor 20 to flow further down the reciprocating conveyor 20 towards the leftmost tote 60 as the path of least resistance shifts. Continued operation of the supply conveyor 10 and the reciprocating conveyor 20 results in frangible products 50 being discharged from the lateral discharge portion 22 of the reciprocating conveyor 20 into the leftmost tote 60 on the tote platform 30.

Figure 4:
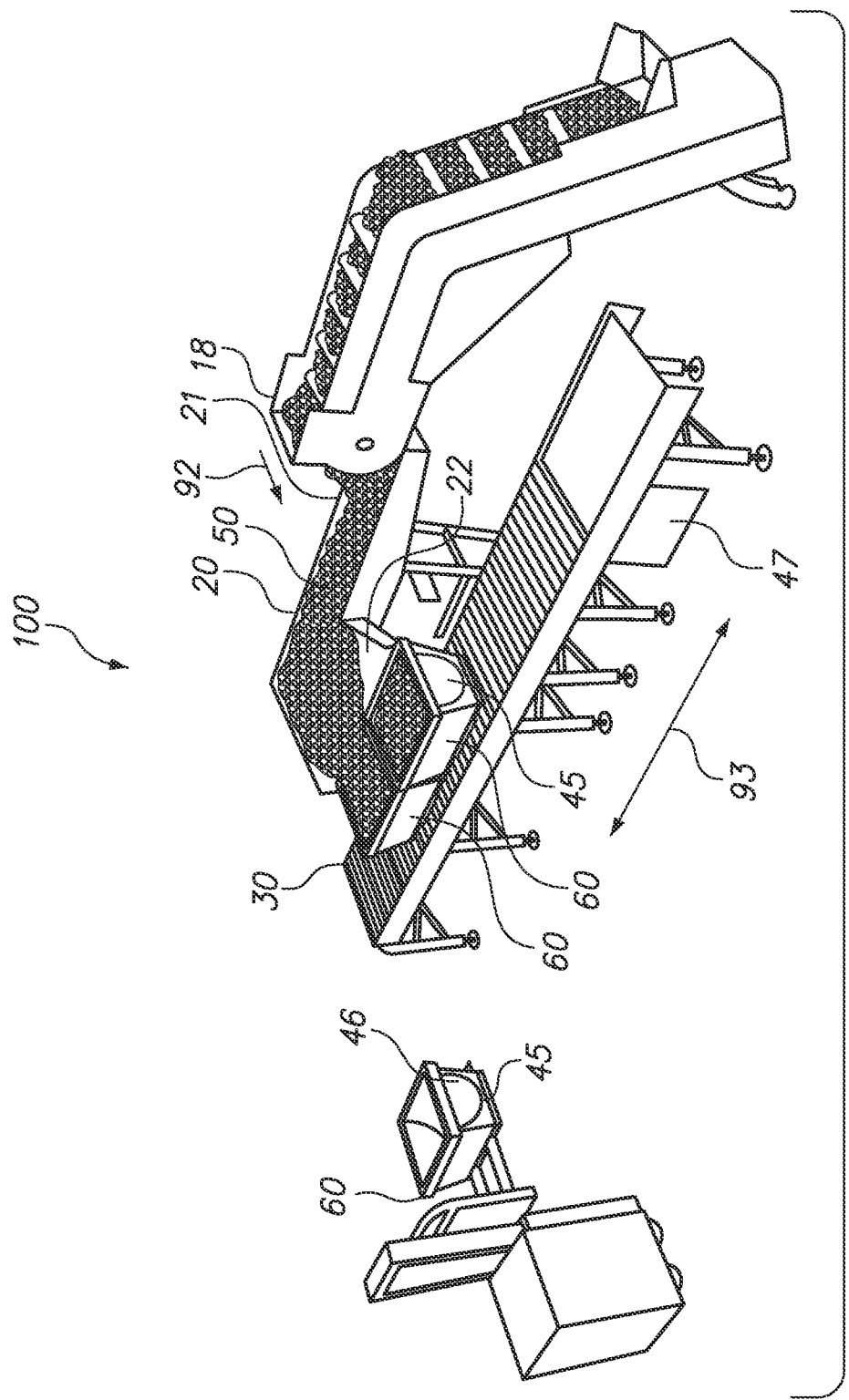
FIG. 4 is the loading station of FIGS. 2 and 3 further illustrating how back pressure resulting from the filling of a first tote causes fragile product to progress further along the reciprocating conveyor to be discharged at a position to fill the second tote adjacent to the first tote.

FIG. 4 is the loading station 100 of FIGS. 2 and 3 further illustrating how back pressure and crowding resulting from the filling of a rightmost tote 60 causes fragile products 50 to progress further along the reciprocating conveyor 20 to be discharged at a position to fill the leftmost tote 60 adjacent to the rightmost tote 60. Once both of the rightmost tote 60 and the leftmost tote 60 shown in FIG. 4 are filled with frangible products 50 as shown in FIG. 4, the supply conveyor 10 and the reciprocating conveyor 20 can be deactivated to prevent further discharge of frangible products 50 from the lateral discharge portion 22 of the reciprocating conveyor 20. At this juncture, the vibration member 87 can be activated to begin vibrationally settling of the frangible products 50 loaded into the leftmost tote 60 and the rightmost tote 60 to provide a more densely packed configuration of the frangible products 50 within the totes 60. It will be noted that the deactivation of the supply conveyor 10 and the reciprocating conveyor 20 prevents frangible products 50 from being discharged from the lateral discharge portion 22 of the reciprocating conveyor 20 as vibrational settling occurs.

Figure 5:
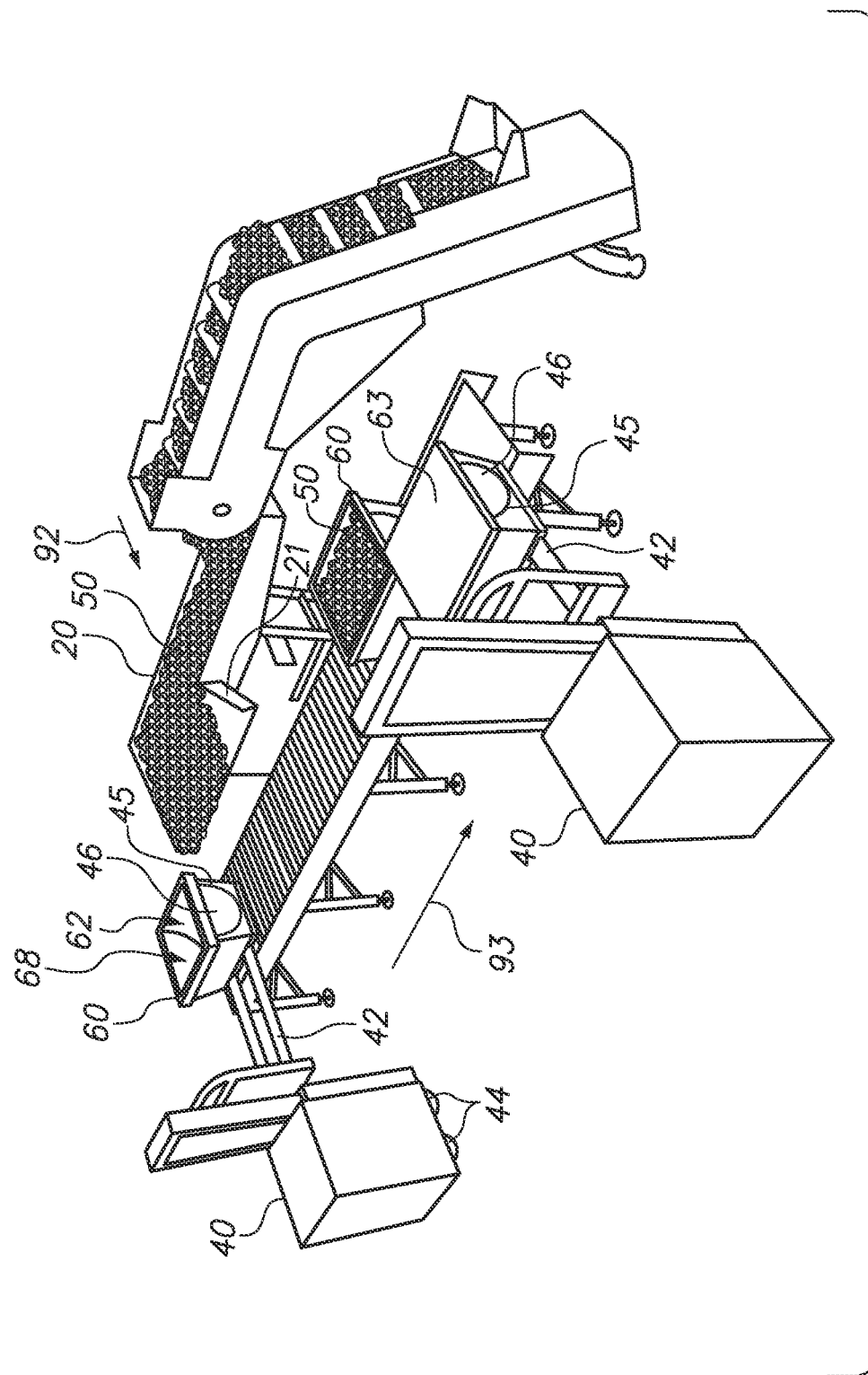
FIG. 5 is the loading station of FIGS. 2-4 further illustrating how totes filled with product can be moved from a first end of the tote support to a second end of the tote support for being sealed with a lid and prepared for transportation to a second location for unloading of the fragile products for packaging, weighing, bagging or for processing.

FIG. 5 is the loading station 100 of FIGS. 2-4 further illustrating how totes 60 filled with frangible product 50 can be moved from a first end 32 of the tote platform 30 to a second end 34 of the tote platform 30 for being sealed with a lid 63 and prepared for transportation to a second location (not shown) for unloading of the fragile products 50 for packaging, weighing, bagging or for processing. The loaded totes 60 containing fragile products 50 in a densely packed configuration can be easily moved along the rollers 33 of the tote platform 30 from the first end 32 to the second end 34. FIG. 5 shows the rightmost tote 60 having a lid 63 in place to seal the contents and to thereby preserve freshness during transport. The loaded and sealed totes 60 can then be removed using the fork lift machine 40 and loaded into a truck for transport.

Figure 6:
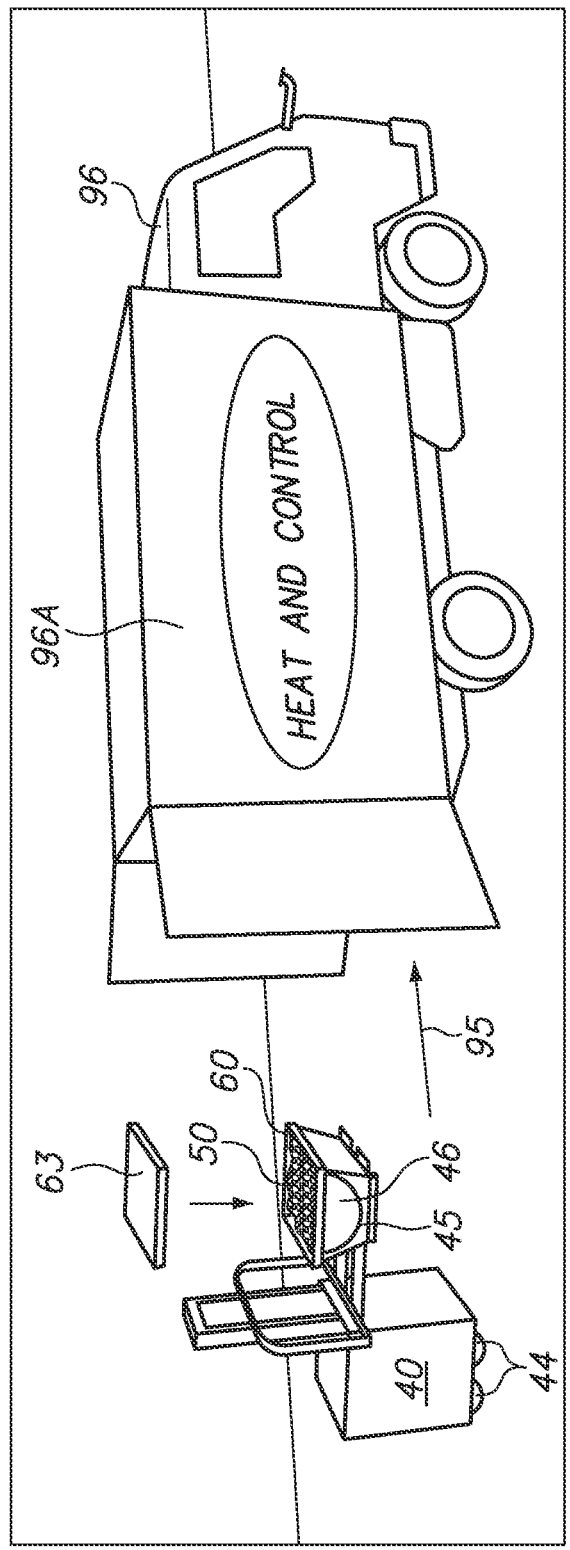
FIG. 6 is an illustration of a truck being loaded with totes filled with frangible products at a first location for transport to a second location.

FIG. 6 is an illustration of a truck 96 having a cargo hold 96A being loaded with totes 60 filled with frangible products 50 at a first location for transport to a second location. The fork lift machine 40 moves on wheels 44 and carries a tote 40 loaded with frangible products 50 and sealed with lid 63 in the direction of the arrow 95 for loading into the cargo hold 96A of the truck 96. In one embodiment of the system of the present invention, nitrogen or some other inert gas can be introduced into the tote 40 prior to sealing with the lid 63 to promote freshness and to prevent staleness during transportation. It will be understood that certain safety precautions must be taken wherever nitrogen or other inert gas is used to prevent unwanted depletion of oxygen levels where personnel may enter.

Figure 7:
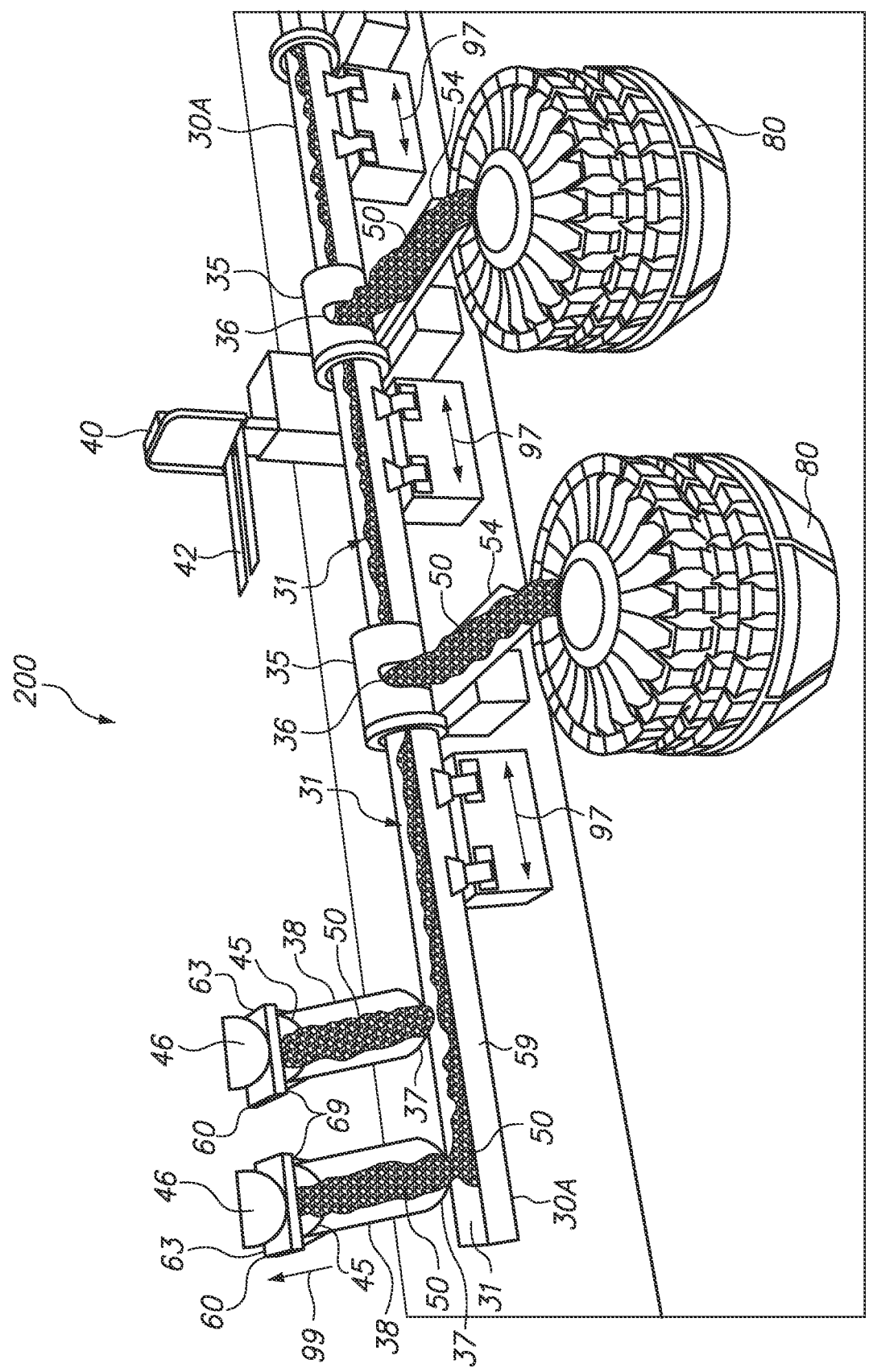
FIG. 7 is a perspective view of one embodiment of an unloading station at a second location at which totes filled with frangible products can be gently unloaded with minimal breakage.

FIG. 7 is a perspective view of one embodiment of an unloading station 200 at a second location at which totes 60 loaded with frangible products 50 can be gently unloaded with minimal breakage. The unloading station 200 includes a pair of tributary troughs 38, each of the tributary troughs 38 having a first end 69 disposed proximal to a tote support 39 (not shown in FIG. 7—see FIG. 8), and a second end 37 disposed proximal to a receiving conveyor 59. The second end 37 of each of the tributary troughs 38 is disposed at a lower elevation than the first end 69 to impart a decline to each tributary trough 38 that aids in the movement of frangible products 50 there along. Each of the tote supports 39 (not shown) supports a tote 60 thereon in a position with the gate 45 aligned with the first end 69 of the adjacent tributary trough 38 to enable frangible products 50 to move from the interior space 68 of the tote 60, through the open gate 45 (with the gate closure 46 removed) and onto the first end 69 of the tributary trough 38. The frangible products 50 then move downwardly along the tributary trough 38 and are discharged from the tributary trough 38 at a second end 37 onto the receiving conveyor 59.

The receiving conveyor 59 shown in FIG. 7 is a reciprocating conveyor powered by a plurality of reciprocating drivers 97 that move the receiving conveyor 59 back and forth as shown by arrows 97A. The receiving conveyor 59 further includes a plurality of adjustable side-discharging gates 35, each having an opening 36 that can be positioned to vary the rate at which the frangible products 50 delivered to the receiving conveyor 59 from the totes 60 are discharged from the receiving conveyor 59 to feeder troughs 54 that deliver the frangible products 50 to the weighing and bagging machines 80. The receiving conveyor 59 includes side walls 30A that straddle a trough 31 in which the frangible products 50 move. The receiving conveyor 59 may be of the kind described and disclosed in U.S. Pat. Nos. 6,527,104, 8,066,114, 6,189,683 and 6,286,665. The adjustable side-discharging gates may be of the kind described and disclosed in U.S. Pat. Nos. 9,567,163 and 6,286,665.

Figure 8:
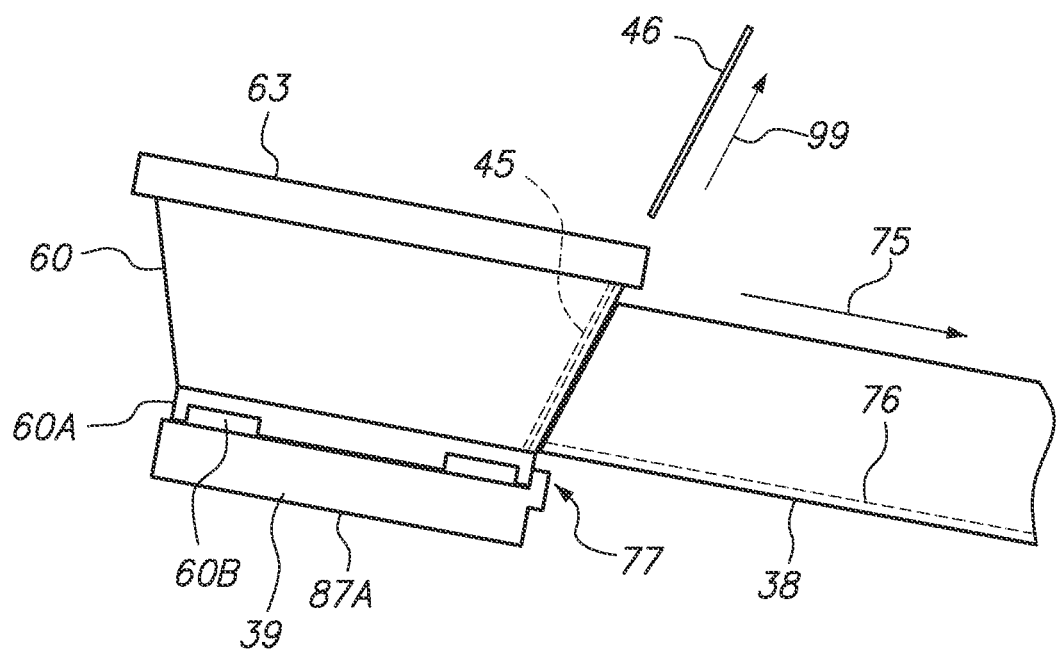
FIG. 8 is an elevation view of a tote filled with frangible products (not shown) is supported on a tote support in alignment with a tributary trough for gently unloading the tote filled with frangible products to a receiving conveyor (not shown).

FIG. 8 is a side elevation view of a tote 60 filled with frangible products 50 (not shown) and sealed with a lid 63 is supported on a tote support 39 to position the loaded tote 60 in alignment with a tributary trough 38 for gently unloading the tote 60 filled with frangible products 50 to the receiving conveyor (not shown). The gate closure 46 is removed from the peripheral slot 60C by moving the gate closure 46 in the direction indicated by the arrow 99 to open the gate 45. The loaded tote 60 is placed in the position shown in FIG. 8. The tote support 39 may be equipped with a tote support vibration member 47 that is activatable to impart vibrations to the tote 60 supported on the tote support 39. The tote support 39 further includes a support member 87A having a stop 77 thereon to engage the base 60A of the tote 60 to maintain the tote 60 in position on the tote support 39 notwithstanding the declined position that promotes movement of the frangible products 50 (not shown) from the interior space (not shown) of the tote 60 and in the direction of the arrow 75 onto the tributary trough 38. The dotted line 76 indicates the position of the lowermost point of the tributary trough 38. Preferably, the lowermost point of the tributary trough 76 is aligned with the lowermost portion 72 of the interior space 68 (see FIG. 1A) to avoid any unwanted abrupt drops or falls that can cause breakage of the frangible products 50.

Figure 9:
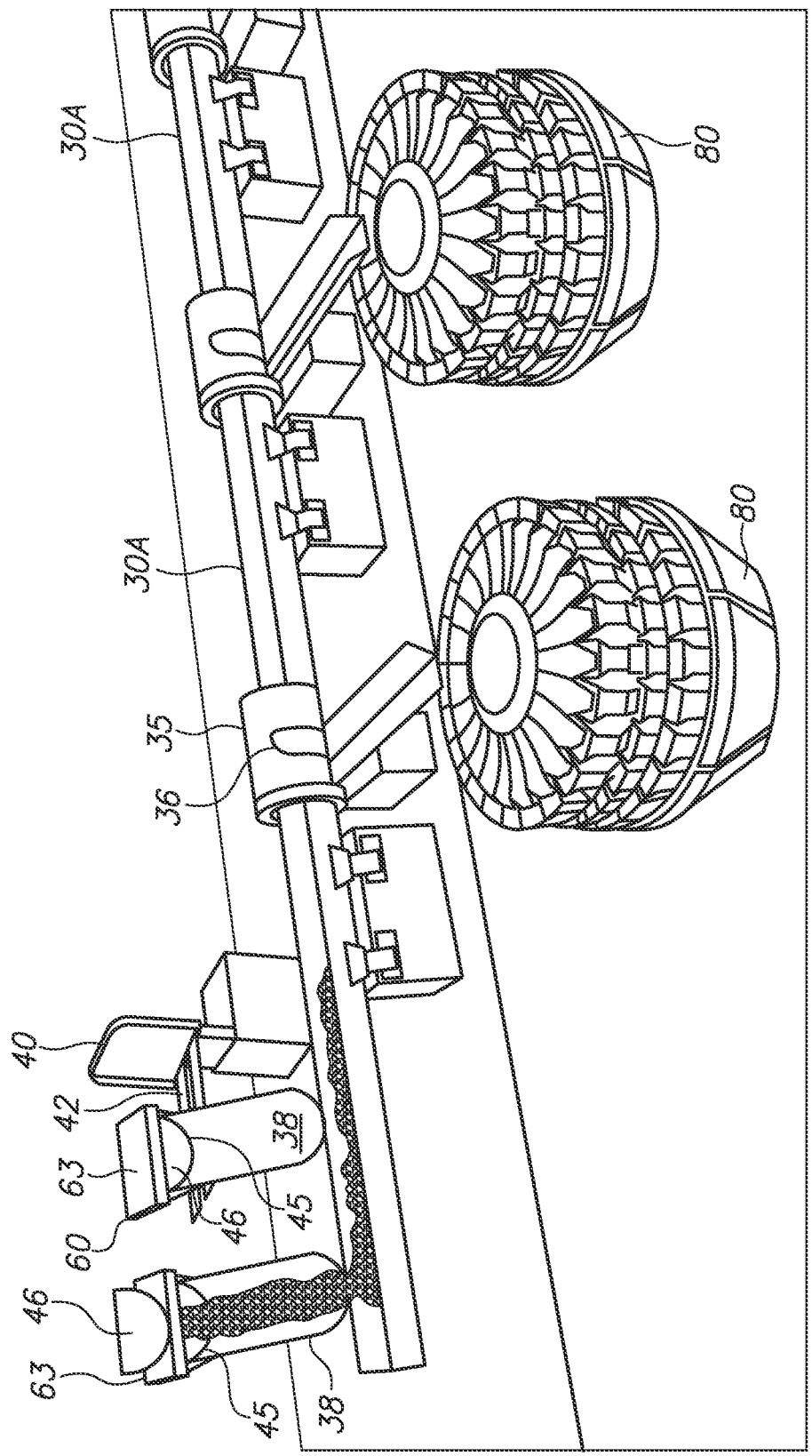
FIG. 9 is the perspective view of the unloading station of FIG. 7 as frangible products are being gently unloaded from a tote through the tributary trough and to the receiving conveyor for being conveyed to weighing and bagging machines.

FIG. 9 is the perspective view of the unloading station 200 of FIG. 7 as frangible products 50 are being gently unloaded from a leftmost tote 60 onto the tributary trough 38 and to the receiving conveyor 59 for being conveyed to weighing and bagging machines 80 as a loaded rightmost tote 60 is being positioned atop the tote support 39 (not shown) by a fork lift machine 40. It can be seen that at this initial stage, the frangible products 50 unloaded from the leftmost tote 38 have not yet moved a sufficient distance on the receiving conveyor 59 to reach the leftmost adjustable side discharging gate 35 in the receiving conveyor 59 that discharges all or an adjustable fraction of the incoming stream of frangible products 50 to the leftmost weighing and bagging machine 80.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

"Frangible products," as that term is used herein, includes food portions that are easily broken such as, for example, potato chips or pretzels, but may also refer to non-edible articles that are produced, packaged, weighed, or sold in large quantities.

What is claimed is:

1. A system for loading and unloading a large plurality of frangible products that prevents unwanted breakage, the system comprising:
    a plurality of totes, each of the totes having a base, an open top, a removable lid sized to engage the open top of the tote to close the open top, a first side, a second side, opposite the first side, a first end intermediate the first side and the second side, a second end opposite the first end and intermediate the first side and the second side, the first end having a gate with an upwardly concave shape, and a gate closure movable between a closed position to close the gate and an open position to open the gate, and an interior space defined by an upwardly concave surface, the upwardly concave surface having a first steeply sloped portion proximal to an intersection between the first side and the open top of the tote, a lowermost portion proximal to the base of the tote, and a first transitionally sloped portion intermediate the lowermost portion of the interior space and the first steeply sloped portion;

a loading station at a first location, the loading station including:
a reciprocating conveyor having a receiving portion at a first end at which the plurality of products are received onto the reciprocating conveyor, a second end, a smooth surface for supporting and conveying a large plurality of the frangible products from the first end towards the second end, and a lateral discharge portion proximal to the second end at which the plurality of frangible products are laterally removed from the reciprocating conveyor, the reciprocating conveyor operable by cyclically moving from a first position in a first direction and at a first rate of acceleration to move the products supported on the smooth surface a distance to a second position, and then returning from the second position to the first position by moving in a second direction, opposite the first direction, at a second rate of acceleration that exceeds the magnitude of the first rate of acceleration to cause the products supported on the smooth surface to slide on the smooth surface;
a tote platform having a top portion for engaging the base of the plurality of totes, a first end of the top portion for supporting the plurality of totes adjacent to the discharge portion at the second end of the reciprocating conveyor such that frangible products discharged from the discharge portion of the reciprocating conveyor fall downwardly and impinge on the first steeply sloped portion proximal to the intersection between the first side and the open top of the tote, the tote platform further having a second end to which one of the totes is moved after being filled with frangible product at the first end of the tote platform;

wherein at least one of the plurality of totes, with the lid removed and the gate closure in the closed position to close the gate at the first end of the at least one tote, is placed with the base supported on the first end of the top portion of the tote platform with the first side of the at least one tote disposed proximal to and below the discharge portion at the second end of the reciprocating conveyor;

wherein the reciprocating conveyor conveys a plurality of the frangible products to the lateral discharge portion of the reciprocating conveyor;

wherein the frangible products are discharged from the lateral discharge portion of the reciprocating conveyor over the intersection between the first side and the open top of the tote and into the open top of the at least one tote to impinge on the first steeply sloped portion;

wherein the frangible products slide down the first steeply sloped portion, along the first transitionally sloped portion and towards the lowermost portion of the interior space of the at least one tote;

wherein additional frangible products are discharged from the lateral discharge portion proximal to the second end of the reciprocating conveyor into the open top of the at least one tote until the interior space of the at least one tote is filled; and wherein the plurality of frangible products discharged into the at least one tote is transported within the at least one tote from the first location to a second location for one of processing, bagging and packaging.

2. The system of claim 1, further comprising:
wherein the reciprocating conveyor includes a switch operable for engaging the reciprocating conveyor from a deactivated mode to an activated mode and for disengaging the reciprocating conveyor from the activated mode to the deactivated mode;
wherein the reciprocating conveyor is disengaged using the switch to allow one or more of the plurality of totes having one or more interior spaces full of the frangible products is removed and replaced with an empty one of the totes.

3. The system of claim 1, further comprising:
a vibration member coupled to the tote platform, the vibration member having an activated mode for imparting vibrations to the top portion of the tote platform to vibrationally settle the frangible product loaded into the interior space of the at least one tote into a densely packed configuration for being transported, and a deactivated mode.

4. The system of claim 1, wherein the discharge portion at the second end of the reciprocating conveyor is sized to discharge frangible products along a section of the reciprocating conveyor that is longer than the first side of the at least one of the totes; and
wherein the first end of the tote platform is sized to accommodate at least two of the totes arranged in a configuration in which the first sides of each of the at least two of the totes are proximal to the discharge portion of the reciprocating conveyor so that frangible products discharged from the discharge portion of the reciprocating conveyor impinge upon the first steeply sloped portion of each of the at least two of the totes.

5. The system of claim 4, wherein a first of the at least two totes is proximal to the first end of the reciprocating conveyor;
wherein a second of the at least two totes is distal to the first end of the reciprocating conveyor; and
wherein the first side of the first of the at least two totes is aligned with and proximal to the first side of the second of the at least two totes on the first end of the top portion of the tote platform.

6. The system of claim 1, wherein the tote platform comprises a plurality of cylindrical rollers, each having an axis, each of the rollers rotatably secured to a frame of the tote platform in an aligned configuration with the remainder of the plurality of rollers to enable the plurality of the totes to be conveyed along the plurality of rollers from the first end of the tote platform to the second end of the tote platform with minimal frictional resistance to movement of the totes.

7. The system of claim 1, further comprising:
an unloading station at a second location spaced apart from the first location, the unloading station including:
a plurality of tributary troughs, each of the tributary trough having a first end for receiving a plurality of frangible products, a second end for discharging the plurality of fragile products, wherein the second end is at a lower elevation than the first end to impart a decline to each of the tributary trough;
a plurality of tote supports, each of the tote supports disposed proximal to the first end of one of the plurality of tributary troughs, each of the tote supports having a first end, a second end and a stop member to engage the base of one of the totes supported on the tote support, the second end of each of the tote supports being at a lower elevation than the first end of the tote support to impart a decline to each of the tote supports, the decline being in the same direction as the decline of the one of the plurality of tributary troughs to which the tote support is proximal;

a plurality of tote support vibration members, each of the tote support vibration members being coupled to one of the plurality of tote supports, each of the tote support vibration members being activatable to impart vibrations to the tote support to which the tote support vibration member is coupled and to thereby impart vibrations to one of the plurality of totes supported thereon; and a receiving conveyor disposed proximal to the second ends of the plurality of tributary troughs to receive and convey frangible products discharged from the plurality of tributary troughs to one of a weighing machine, a packaging machine, a bagging machine and a processing facility at the second location;

wherein the plurality of totes loaded with frangible products and transported from the first location to the second location are disposed on the plurality of tote supports;

wherein the stops on each of the plurality of tote supports engages the base of one of the plurality of totes supported on the tote support to retain the one of the plurality of tote supports against sliding along the declined tote support;

wherein the gate closure is moved to open the gate in each of the plurality of totes supported on the tote supports;

wherein each of the plurality of tote support vibration members is activatable to impart vibrations to the one of the plurality of tote supports to which it the tote support vibration member is coupled and to impart vibrations to one of the plurality of loaded tote supports supported thereon to cause frangible food portions to move out of the interior space of the tote support and onto the first end of the tributary trough to which the tote support is proximal;

wherein each of the plurality of tributary troughs discharges the frangible products onto the receiving conveyor which conveys the frangible products to one of the weighing machine, bagging machine, packaging machine and processing facility at the second location.

8. The system of claim 7, wherein the receiving conveyor is a reciprocating conveyor.

9. The system of claim 7, wherein a cross-sectional shape of at least one of the tributary troughs conforms to a cross-sectional shape of the interior space of at least one of the totes.

10. The system of claim 7, wherein a lowermost portion of each of the plurality of tributary troughs is aligned with the lowermost portion of the interior space of one of the plurality of totes supported on one of the plurality of tote supports proximal to the first end of the at least one of the tributary troughs.

11. A system for gently handling a stream of a plurality of fragile products, comprising:

a reciprocating conveyor with a first end, a second end, a first side, a second side, an entry trough at the first end, and a discharge ramp to receive a stream of fragile product from the entry trough, the discharge ramp disposed along the first side of the reciprocating conveyor;

one or more totes, each of the totes having a bottom, a top opening, a first end, a second end, a discharge opening at the first end, a gate removably securable to the tote at the discharge opening to close the discharge opening, and an interior storage space within the tote for receiving product discharged from the discharge ramp of the reciprocating conveyor and into the top opening, the interior storage space formed intermediate a first interior side wall and a second interior side wall and intermediate the top opening and a curved floor proximal to the bottom of the tote, the first interior side wall and the second interior side wall each including a steep top portion and a curved lower portion where each of the first interior side wall and the second interior side wall meet the curved floor;

wherein with the tote disposed below the discharge ramp of the reciprocating conveyor with one of the first interior side wall and the second interior side wall proximal to the discharge ramp, the fragile product received into the top opening of the tote slides gently down the top portion of the one of the first interior side wall and the second interior side wall disposed adjacent the discharge ramp and along the curved lower portion of the one of the first interior side wall and the second interior side wall disposed adjacent the discharge ramp before sliding gently along the curved floor of the tote to enable the plurality of fragile articles to be loaded into the tote and to gently slide along the discharge ramp of the reciprocating conveyor, off the discharge ramp, along the top portion of the one of the first interior side wall and the second interior side wall disposed adjacent to the discharge ramp, along the lower curved portion of the one of the first interior side wall and the second interior side wall disposed adjacent to the discharge ramp, and onto the curved floor.

12. The system of claim 11, wherein the plurality of fragile products further slide along the curved floor of the tote to a lowermost portion of the curved floor, whereupon the plurality of fragile products decelerate as they move beyond the lowermost portion of the curved floor towards the lower curved portion of the other of the first interior side wall and the second interior wall.

13. The system of claim 11, wherein as additional fragile product enters the tote through the top opening, the fragile product accumulated in the curved floor is pushed upwardly along the curved lower portion of the other of the first side wall and the second side wall that is distal to the discharge ramp and opposite the curved floor from the one of the first side wall and the second side wall adjacent to the discharge ramp as the accumulated product in the curved floor is displaced from the curved floor, the shape of the first side wall, the second side wall and the curved floor of the tote prevents the fragile product being loaded into the tote from being broken due to abrupt impact.

14. The system of claim 1, wherein the at least one tote is two or more totes aligned on the first end of the tote platform with the first side of each of the two or more totes is aligned with the first side of the others of the two or more totes, and the first sides of the two or more totes are proximal to and below an edge of the lateral discharge portion of the reciprocating conveyor;

wherein the lateral discharge portion of the reciprocating conveyor is substantially longer than the first side of the two or more totes to enable filling of the two or more totes by discharging frangible products from the edge of the lateral discharge portion of the reciprocating conveyor; and wherein one of the two or more totes that is proximal to the first end of the reciprocating conveyor fills until backpressure results from filling of the one of the two or more totes that is proximal to the first end of the reciprocating conveyor that causes incoming frangible products moving on the reciprocating conveyor to move further towards the second end of the reciprocating conveyor and to then be discharged from the lateral discharge portion of the reciprocating conveyor into a second of the two or more totes that is disposed adjacent to the first of the two or more totes.

15. A method of filling two or more totes with frangible products for transportation of the frangible products, comprising:

providing a plurality of totes, each of the totes having a base, an open top, a removable lid sized to engage the open top of the tote to close the open top, a first side, a second side, opposite the first side, a first end intermediate the first side and the second side, a second end opposite the first end and intermediate the first side and the second side, the first end having a gate with an upwardly concave shape, and a gate closure movable between a closed position to close the gate and an open position to open the gate, and an interior space defined by an upwardly concave surface, the upwardly concave surface having a first steeply sloped portion proximal to an intersection between the first side and the open top of the tote, a lowermost portion proximal to the base of the tote, and a first transitionally sloped portion intermediate the lowermost portion of the interior space and the first steeply sloped portion;

providing, at a first location, a reciprocating conveyor having a receiving portion at a first end at which the plurality of products are received onto the reciprocating conveyor, a second end, a smooth surface for supporting and conveying a large plurality of the frangible products from the first end towards the second end, and a lateral discharge portion proximal to the second end at which the plurality of frangible products are laterally removed from the reciprocating conveyor, the reciprocating conveyor operable by cyclically moving from a first position in a first direction and at a first rate of acceleration to move the products supported on the smooth surface a distance to a second position, and then returning from the second position to the first position by moving in a second direction, opposite the first direction, at a second rate of acceleration that exceeds the magnitude of the first rate of acceleration to cause the products supported on the smooth surface to slide on the smooth surface;

providing, at the first location, a tote platform having a top portion for engaging the base of the plurality of totes, a first end of the top portion for supporting the plurality of totes adjacent to the discharge portion at the second end of the reciprocating conveyor such that frangible products discharged from the discharge portion of the reciprocating conveyor fall downwardly and impinge on the first steeply sloped portion proximal to then intersection between the first side and the open top of the tote, the tote platform further having a second end to which one of the totes is moved after being filled with frangible product at the first end of the tote platform;

positioning at least two of the plurality of totes, with the lid removed and the gate closure in the closed position to close the gate at the first end of the at least one tote, with the bases of the totes supported on the first end of the top portion of the tote platform with the first side of the at least two totes disposed proximal to and below the lateral discharge portion at the second end of the reciprocating conveyor;

activating the reciprocating conveyor to convey a plurality of the frangible products to the lateral discharge portion of the reciprocating conveyor;

discharging at least some of the plurality of the frangible products from the lateral discharge portion of the reciprocating conveyor over the intersection between the first side and the open top of the tote and into the open top of the tote on the tote platform and proximal to the first end of the reciprocating conveyor to impinge on the first steeply sloped portion;

filling the tote on the tote platform that is proximal to the first end of the reciprocating conveyor until backpressure is created by an accumulation of frangible products along the edge of the lateral discharge portion adjacent to the tote on the tote platform that is proximal to the first end of the reciprocating conveyor;

conveying incoming frangible products further down the reciprocating conveyor towards the second end of the reciprocating conveyor and towards the edge of the lateral discharge portion of the reciprocating conveyor that is adjacent to a tote that is distal to the first end of the reciprocating conveyor and adjacent to the tote that is proximal to the first end of the reciprocating conveyor;

filling the tote on the tote platform that is distal to the first end of the reciprocating conveyor and adjacent to the tote that is proximal to the first end of the reciprocating conveyor with frangible products discharged from the edge of the lateral discharge portion of the reciprocating conveyor;

deactivating the reciprocating conveyor;

vibrationally settling the frangible products in the tote that is proximal to the first end of the reciprocating conveyor and in the tote that is distal to the first end of the reciprocating conveyor; and transporting the frangible products in the tote that is proximal to the first end of the reciprocating conveyor and in the tote that is distal to the first end of the reciprocating conveyor to a second location;

wherein filling the totes includes causing the frangible products slide down the first steeply sloped portion, along the first transitionally sloped portion and towards the lowermost portion of the interior space of the at least one tote.

16. The method of claim 15,
wherein the plurality of frangible products discharged into the tote that is proximal to the first end of the reciprocating conveyor and in the tote that is distal to the first end of the reciprocating conveyor is transported within the totes from the first location to a second location for one of processing, bagging and packaging.

* * * * *